United States Patent
Weller

(10) Patent No.: US 7,107,526 B1
(45) Date of Patent: Sep. 12, 2006

(54) TRANSPARENT INJECTION OF SPECIFIC CONTENT INTO WEB PAGES VIEWED WHILE BROWSING

(75) Inventor: Scott Wayne Weller, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/487,585

(22) Filed: Jan. 19, 2000

(51) Int. Cl.
G06F 17/00 (2006.01)
G06F 15/00 (2006.01)

(52) U.S. Cl. ............... 715/530; 715/513; 715/526; 715/527

(58) Field of Classification Search ............. 715/530, 715/513, 526, 527
See application file for complete search history.

(56) References Cited

U.S. PATENT DOCUMENTS

| | | | |
|---|---|---|---|
| 5,845,057 A * | 12/1998 | Takeda et al. | 358/1.15 |
| 5,860,074 A * | 1/1999 | Rowe et al. | 715/526 |
| 5,963,968 A * | 10/1999 | Warmus et al. | 715/517 |
| 6,011,537 A * | 1/2000 | Slotznick | 715/733 |
| 6,085,226 A * | 7/2000 | Horvitz | 709/203 |
| 6,122,647 A * | 9/2000 | Horowitz et al. | 715/513 |
| 6,167,382 A * | 12/2000 | Sparks et al. | 705/26 |
| 6,236,987 B1 * | 5/2001 | Horowitz et al. | 707/3 |
| 6,240,456 B1 * | 5/2001 | Teng et al. | 709/230 |
| 6,282,548 B1 * | 8/2001 | Burner et al. | 707/104.1 |
| 6,301,584 B1 * | 10/2001 | Ranger | 707/103 R |
| 6,301,586 B1 * | 10/2001 | Yang et al. | 707/104.1 |
| 6,327,045 B1 * | 12/2001 | Teng et al. | 358/1.15 |
| 6,327,599 B1 * | 12/2001 | Warmus et al. | 715/517 |
| 6,351,317 B1 * | 2/2002 | Sasaki et al. | 358/1.15 |
| 6,366,923 B1 * | 4/2002 | Lenk et al. | 707/104.1 |
| 6,385,728 B1 * | 5/2002 | DeBry | 726/9 |
| 6,421,070 B1 * | 7/2002 | Ramos et al. | 715/763 |
| 6,446,100 B1 * | 9/2002 | Warmus et al. | 715/517 |
| 6,470,171 B1 * | 10/2002 | Helmick et al. | 434/362 |
| 6,505,212 B1 * | 1/2003 | Nakano et al. | 707/200 |
| 6,538,765 B1 * | 3/2003 | Ikedo | 358/1.16 |
| 6,605,120 B1 * | 8/2003 | Fields et al. | 715/513 |
| 6,618,163 B1 * | 9/2003 | Roosen et al. | 358/1.15 |
| 6,618,824 B1 * | 9/2003 | Hastings | 714/35 |
| 6,628,415 B1 * | 9/2003 | Lawrence et al. | 358/1.15 |
| 6,674,539 B1 * | 1/2004 | Serra et al. | 358/1.15 |
| 6,674,992 B1 * | 1/2004 | Helmick et al. | 434/362 |
| 6,678,500 B1 * | 1/2004 | Helmick et al. | 434/362 |
| 6,683,629 B1 * | 1/2004 | Friskel et al. | 715/804 |
| 6,684,053 B1 * | 1/2004 | Helmick et al. | 434/362 |
| 6,690,481 B1 * | 2/2004 | Yeung et al. | 358/1.15 |
| 6,738,841 B1 * | 5/2004 | Wolff | 710/62 |

(Continued)

OTHER PUBLICATIONS

Wright, F.D.; Requirements and design goals for an internet printing protocol; Dec. 1998; Acm Press; StandardView archive, vol. 6, Issue 4; pp. 172-179.*

Primary Examiner—Doug Hutton
Assistant Examiner—N Hillery
(74) Attorney, Agent, or Firm—Oliff & Berridge, PLC

(57) ABSTRACT

A software program is installed somewhere on a network and acts as a custom proxy service. The software is used to filter content returning from a source to a web browser. At an appropriate point in the returning data stream, non-selectable content, such as, for example a corporate logo, or selectable content, such as, for example, a linking to other document sources or a print function, is injected. If the selectable content requires support processing, the software program installed on the network will process the selectable content and provide an end user with the processed information without requiring the end user's downloading device to process the downloaded information.

23 Claims, 12 Drawing Sheets

U.S. PATENT DOCUMENTS 6,772,139 B1 * 8/2004 Smith, III .................. 707/3
6,871,043 B1 * 3/2005 Sanda .................. 434/307 R
6,938,202 B1 * 8/2005 Matsubayashi et al. .. 715/501.1

* cited by examiner

TRANSPARENT INJECTION OF SPECIFIC CONTENT INTO WEB PAGES VIEWED WHILE BROWSING

BACKGROUND OF THE INVENTION

1. Field of the Invention

This invention relates to web page applications.

2. Description of Related Art

Currently, it is well known to access information including downloadable information on distributed networks, such as, for example, the Internet and, more particularly, the World Wide Web portion of the Internet, using an information retrieval system, such as, for example, a computer or personal digital assistant (PDA) equipped with a web browser. Downloadable information can include, for example, files, folders, documents, pictures, movies, sounds, or the like. Additionally, downloadable information can be a part of the body of an accessed web page. Alternatively, the downloadable information can be in the form of a photograph, icon, symbol, hypertext, or other link to another web page. To access the contents of a particular linked web page, the link must be separately selected to access and open the linked web page. Once the link is selected and the linked web page is opened, a separate window containing the contents of the linked web page is downloaded to the user's computer or PDA and displayed. In certain instances, the downloadable information may require opening a separate application program before the downloadable information can be displayed.

Generally, when a link or other downloadable information is selected, the link or other downloadable information is accessed and downloaded to a memory portion of the computer or PDA that is being used to access the link or other downloadable information.

If the user desires to print or output the downloaded information, a job containing the downloaded information must be built. Ordinarily, building jobs from web-based documents requires downloading to the local workstation all of the desired information from the particular web site containing the information. Software embedded in the user's computer or PDA is then used to assemble the information into a job. Once the job has been assembled, the job is sent to an appropriate output device.

SUMMARY OF THE INVENTION

Often, downloadable information is, or contains, large files. Thus, when a user attempts to access and download information, the downloadable information can consume a great deal of storage space on the user's computer. Furthermore, when the user attempts to print or output the downloaded information, the performance of the user's computer is unnecessarily slowed while the downloaded information is compiled into a job, as described above.

Not only is the process of building a job tedious, but the storage and bandwidth required by the user's computer or PDA can be significant. Therefore, if the user attempts to access other information while the job is being built or output, not only is the output rate of the computer or PDA slowed, but the rate at which the computer or PDA accesses additional information is slowed as well. Thus, until the output job is built and output, the user's computer or PDA accesses information at a rate that is slower than the optimum rate of the computer or PDA. This problem is compounded when the downloadable information requires a separate application program to view the downloadable information.

Accordingly, this invention provides systems, methods, and graphical user interfaces that allow distributed network users to download information without needlessly consuming storage space on, or slowing the operation of, the user's computer or PDA.

The systems, methods, and graphical user interfaces of this invention provide a software program that is installed somewhere on a network to act as a custom proxy server. This software program is used to filter all of the information that is returned from an information source, such as a web page, to a web browser. At an appropriate point in the returning data stream, specific content is injected into the returned information. By merely directing the web browser to this proxy server, the user is able to receive the injectable content.

The systems, methods, and graphical user interfaces of this invention provide both non-selectable injectable content and selectable injectable content that is transparently delivered into a user's web browser. The non-selectable injectable content includes displayed icons, symbols, trademarks, or the like, such as, for example, a corporate logo. In contrast, selectable injectable content can be represented by icons, buttons, selectable images, or the like, which represent an underlying function to be performed. In various exemplary embodiments, these underlying functions include, for example, print services, job build services, links to other document sources, data reduction, information filtering, and the like. The selectable injected content can be used as a portal to other information and document sources, can be used to download information, or can be used to perform calculations, data reductions or other information filtering operations.

In one exemplary embodiment, if a user selects a print services selectable content icon while viewing a particular web page, any data link, or uniform resource locator (URL) on the web page that point to a printable document will be added to a print list. The print list is then displayed as a new web page in the user's web browser.

The new web page includes a print button that allows the user to send any number of the listed documents to an appropriate storage or output device as a job. Each uniform resource locator (URL) in the print list is preceded by a selectable check-box to indicate its inclusion in the job. The appropriate storage or output device receives the job without routing the contained data through the user's computer or PDA.

In the event that the software used to process the documents is embedded, that is, it resides in the user's computer or PDA, the documents may be sent to a local device or any other appropriate destination on the network.

This invention separately provides systems and methods to decrease the amount of storage space that a given job consumes on the user's computer or PDA.

This invention separately provides systems and methods to increase the speed and efficiency of the user's computer or PDA as the user accesses downloadable information on a distributed network.

This invention separately provides systems, methods and graphical user interfaces for a download and output information option that allows the user to download and output information having a substantially simple and user-friendly design.

This invention separately provides systems and methods that allow an output device to receive an output job without routing the data contained in the output job through a user's computer or PDA.

This invention separately provides systems and methods that allow non-selectable and/or selectable content to be transparently delivered into a user's web browser.

This invention separately provides systems and methods that allow information viewing and editing without the need for additional software to be embedded in a user's computer or PDA.

This invention separately provides systems and methods that allow print jobs to be built from web-based document sources without installing additional software on a user's computer or PDA.

This invention separately provides systems and methods that allow print jobs to be built from web-based document sources without the need for a powerful computer or PDA.

This invention separately provides systems and methods that can be used to develop a networked stand-alone scanner offering scan-net/print/fax/e-mail capability.

These and other features and advantages of this invention are described in or are apparent from the following detailed description of the exemplary embodiments.

BRIEF DESCRIPTION OF THE DRAWINGS

The exemplary embodiments of this invention will be described in detail, with reference to the following figures, wherein.

DETAILED DESCRIPTION OF THE PREFERRED EMBODIMENT

For simplicity and clarification, the operating principles, design factors, and layout of the specific content injection systems, methods, and graphical user interfaces according to this invention are explained with reference to various exemplary embodiments of the specific content injection systems, methods, and graphical user interfaces according to this invention. The basic explanation of the operation of the specific content injection systems, methods, and graphical user interfaces is applicable for the understanding and design of the constituent components employed in the specific content injection systems, methods, and graphical user interfaces of this invention.

Furthermore, for the sake of simplicity, the term document will be used. It should be understood that the term document is not limited to a single document, but can also include more than one document.

Figure 1:
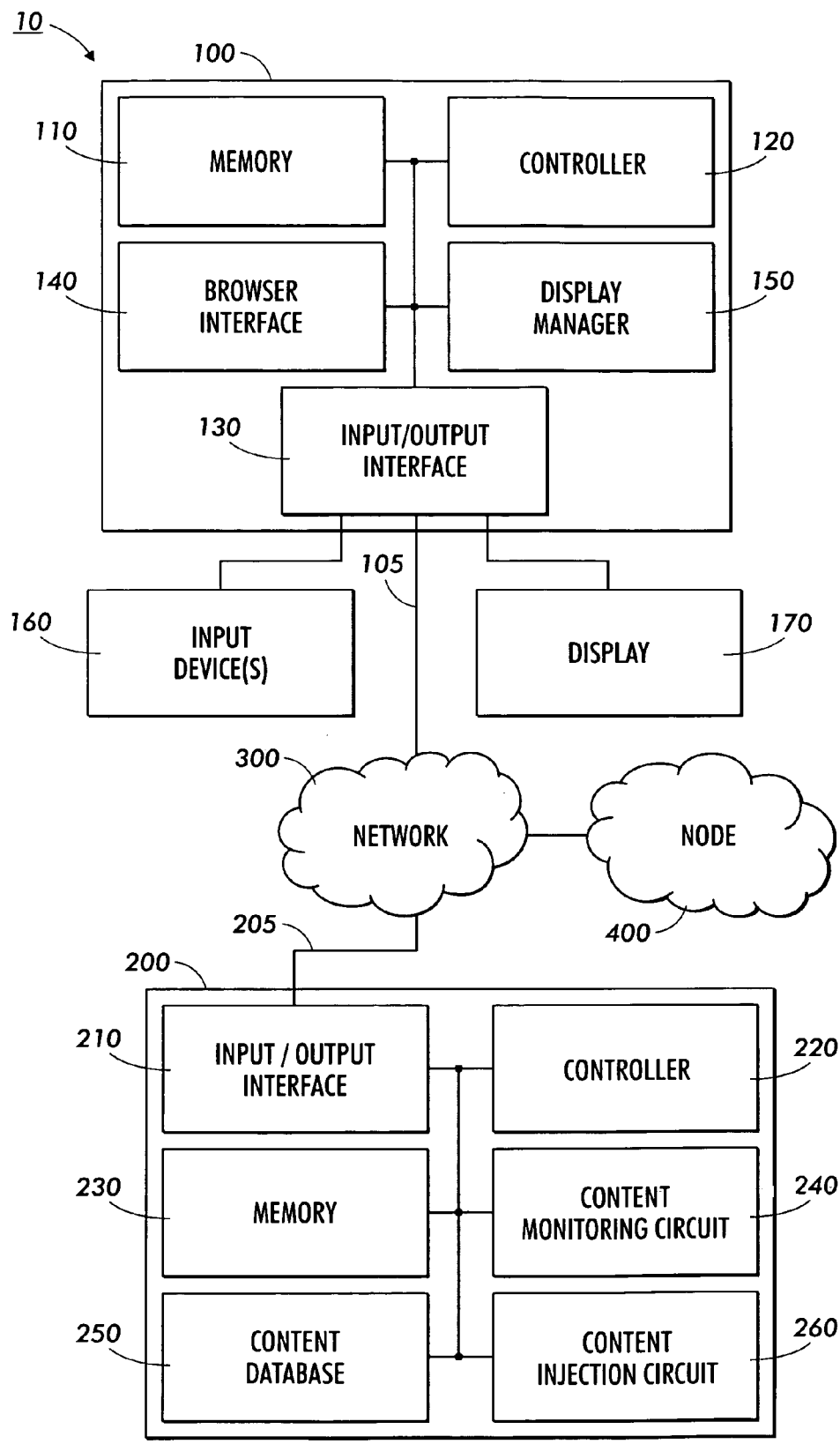
FIG. 1 is a functional block diagram outlining a first exemplary embodiment of the specific content injection system according to this invention.

FIG. 1 is a functional block diagram outlining a first exemplary embodiment of the specific content injection system 10 according to this invention. As shown in FIG. 1, a specific content injection system 10 includes a computer or personal digital assistant (PDA) 100 and a proxy server 200.

The computer or PDA 100 includes at least some of a memory 110, a controller 120, an input/output interface 130, a browser interface 140, and a display manager 150. The input/output interface 130 interfaces with one or more input/output devices 160, a network 300, and a display 170. The input/output interface 130 can also interface with a particular node 400, such as, for example, a specific web page, of the network 300.

As shown in FIG. 1, the memory 110 can be implemented using any appropriate combination of alterable, volatile or non-volatile memory or non-alterable, or fixed, memory. The alterable memory, whether volatile or non-volatile, can be implemented using any one or more of non-selectable or dynamic RAM, a floppy disk and disk drive, a writable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

In various exemplary embodiments, the memory 110 stores software and data used by the specific content injection system 10. For example, the memory 160 stores word processing software and communication software. The controller 120 manages reading data from and writing data to the memory 110. The controller 120 drives the transmission of data to and the reception of data from the input/output devices 160, the network 300, and the display 170 through the input/output interface 130.

In various exemplary embodiments, the display manager 150 drives the display 170. The browser interface 140 allows the user to access, through the input/output interface 130, information, including downloadable information, on the network 300 or a particular node 400 of the network 300.

In various exemplary embodiments, the computer or PDA 100 also includes a display 170 and one or more input devices 160. In various exemplary embodiments, the display 170 can be a cathode ray tube display, a liquid crystal display or any other known or later developed system capable of displaying data. The one or more input devices 160 can be one or more of a keyboard, a mouse, a touch screen, a touch pad, a microphone or any other known or later developed device capable of inputting data.

In the various exemplary embodiments described herein, the computer or PDA 100 interfaces, for example, with the network 300, or a particular node 400 of the network 300, through the direct wired connection using the input/output interface 130. Alternatively, the computer or PDA 100 can interface with the network 300 or a particular node 400 of the network 300, through the linked connection 105. The linked connection 105 can be any known or later developed device or system for connecting the computer or PDA 100 to the network 300 or a particular node 400 of the network 300, including a wireless link, a connection over a LAN, a WAN, or any other distributed network, a connection over the public switched telephone network, a connection over a coaxial cable (i.e., CATV) system, a connection over a cellular telephone network, a satellite connection or the like. In general, the linked connection 105 can be any known or later developed connection system or structure usable to connect the computer or PDA 100 to the network 300 or a particular node 400 of the network 300, including both wired and wireless connections.

The proxy server 200 includes at least some of an input/output interface 210, a controller 220, a memory 230, a content monitoring circuit 240, a content database 250, and a content injection circuit 260. The proxy server 200 interfaces with the network 300 through the input/output interface 210. Additionally, the proxy server 200 interfaces with the computer or PDA 100 through the input/output interface 210 and network 300.

In various exemplary embodiments, the memory 230 can be implemented using any appropriate combination of alterable, volatile or non-volatile memory or non-alterable, or fixed, memory. The alterable memory, whether volatile or non-volatile, can be implemented using any one or more of non-selectable or dynamic RAM, a floppy disk and disk drive, a writable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

In the various exemplary embodiments described herein, the proxy server 200 interfaces, for example, with the network 300, or a particular node 400 of the network 300, via a direct wired connection using the input/output interface 210. Alternatively, the proxy server 200 can interface with the network 300 or a particular node 400 of the network 300 through the any linked connection 205. The linked connection 205 can be any known or later developed device or system for connecting the proxy server 200 to the network 300 or a particular node 400 of the network 300, including a wireless link, a connection over a LAN, a WAN, or any other distributed network, a connection over the public switched telephone network, a connection over a coaxial cable (i.e., CATV) system, a connection over a cellular telephone network, a satellite connection or the like. In general, the linked connection 205 can be any known or later developed connection system or structure usable to connect the proxy server 200 to the network 300 or a particular node 400 of the network 300, including both wired and wireless connections.

As shown in FIG. 1, the memory 230 stores software including a software program that acts as a custom proxy server used by the specific content injection system 10. The controller 220 manages reading data from and writing data to the memory 230. Additionally, the controller 220 drives the transmission of data to and the reception of data from the network 300, the memory 230, the content monitoring circuit 240, the content database 250, and the content injection circuit 260 through the input/output interface 210.

The content monitoring circuit 240 monitors incoming data from the network 300 or a particular node 400 of the network 300. The content database 250 stores both the non-selectable and the selectable injectable content. As described above, non-selectable injectable content describes, for example, a corporate logo or a trademark that is displayed in an accessed web page. In contrast, selectable injectable content describes, for example, print services, job build services, links to other document sources, data reduction, information filtering, and the like, that is displayed in an accessed web page. The content injection circuit 260 injects the non-selectable and/or the selectable injectable content in one or more appropriate locations, as dictated by the content monitoring circuit 240, into the incoming data from the network 300 or a particular node 400 of the network 300.

In various exemplary embodiments, the specific content injection system 10 will be included as part of the software executing on a server. It should be appreciated that any other known or later developed system capable of processing and outputting data could be used in place of the server.

During operation of one exemplary embodiment of the specific content injection system 10, a user browses and accesses information on the network 300 or a particular node 400 of the network 300. In various exemplary embodiments, the information is organized in the form of web pages on the network 300 or a particular node 400 of the network 300. As the user browses and accesses various web pages on the network 300 or a particular node 400 of the network 300, the content monitoring circuit 240 monitors all of the information that is contained in the accessed web pages. As various web pages are accessed, the content injection circuit 260 injects the non-selectable injectable content and/or the selectable injectable content stored in the content database 250 in one or more appropriate locations in the incoming web pages. The one or more appropriate locations for the injected content is determined as described below with reference to FIG. 2.

Once the appropriate non-selectable injectable content and/or the selectable injectable content has been added to the incoming web page, the web page is transmitted, through the input/output interface 210, to the computer or PDA 100

The computer or PDA 100 receives the accessed web page with the appropriate non-selectable injectable content and/or the selectable injectable content. The computer or PDA uses the browser interface 140 to transfer the accessed web page with the appropriate non-selectable injectable content and/or the selectable injectable content, through the display manager 150, to the display 170.

While reviewing the information displayed in the accessed web page, the user may wish to access any or all downloadable information displayed on that particular web page. To accomplish this, the user merely selects an appropriate selectable injected content icon for the task that the user wishes to accomplish.

If, for example, the user wishes to print all or a portion of the printable documents accessible from the displayed web page, the user merely selects a print services selectable injectable content icon. Once the print services selectable injectable content icon is selected, the controller 220 compiles a list in the memory 230 including each data link, or uniform resource locator (URL), on the web page that points to a printable document. The print list is then transmitted from the memory 230, through the input/output interface 210, to the input/output interface 130. Once the print list is received by the input/output interface 130, the controller 120 controls the browser interface 140 and the display manager 150 to display the print list on the display 170 as a new web page.

The new web page displayed on the display 170 includes the print list and a selectable menu that invites the user to select and send any number of the listed documents to an appropriate output device as a job. Once the user has selected the desired documents to be printed, the controller 220 individually and sequentially accesses each document to be printed. As each document is accessed, the controller 220 performs any processing necessary to prepare each document for printing.

When the desired documents are prepared, the controller 220 outputs the desired documents through the input/output interface 210 to an appropriate output device. Thus, the specific content injection systems and methods of this invention allow the user to select downloadable information from, for example, a web page on the network 300 or the particular node 400 of the network 300, and have that downloadable information downloaded from the web page, prepared, and printed without routing the data contained in the downloadable information through the user's computer or PDA 100.

In the exemplary embodiment described above, the user selects a print services selectable content icon. However, it should be understood that, in response to the user's selection of any of the selectable content icons described above, such as, for example, a link to other information and document sources icon, a download information icon, a perform calculations icon, a data reductions icon, an information filtering operations icon, or the like, the specific content injection system 10 operates to perform the selected action in the proxy server 200 so that the action does not require the user's computer or PDA 100 to perform the action.

It should also be understood that the actions that can be performed by the specific content injection system 10 of this invention are not limited to the actions listed above. The specific content injection system 10 of this invention can perform any actions that can be performed by software executing on a programmed general purpose computer, a special purpose computer, a microprocessor or the like.

Figure 2:
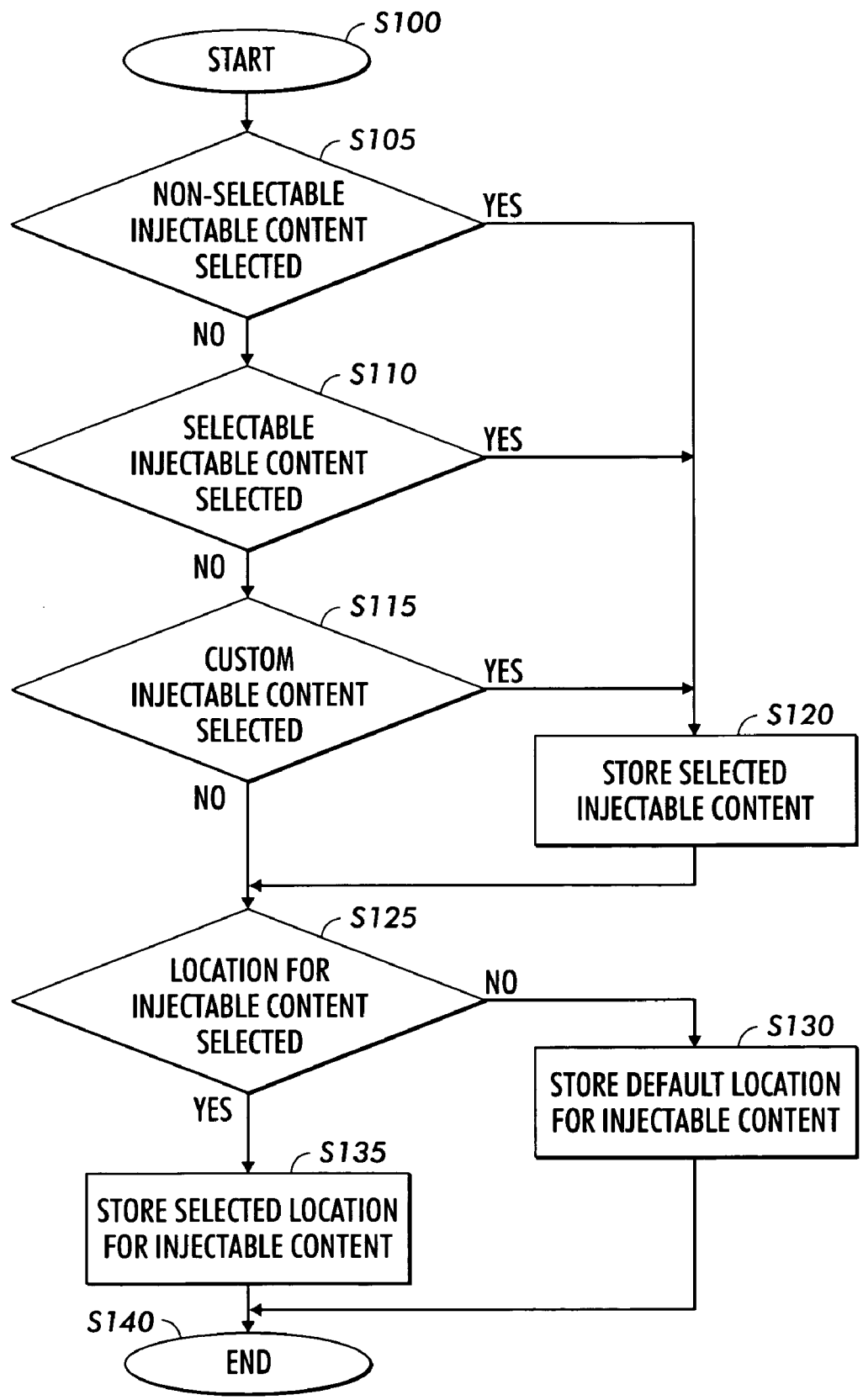
FIG. 2 is a flowchart outlining one exemplary embodiment of a method for defining specific injectable content according to this invention.

FIG. 2 is a flowchart outlining one exemplary embodiment of a method for storing specific injectionable content according to this invention. In various exemplary embodiments, a user can select which specific injectionable content will be stored. Alternatively, the injectionable content to be stored can be selected by, for example, default or by the entity responsible for the memory.

In various exemplary embodiments, specific injectionable content includes one or more of non-selectable injectionable content, selectable injectionable content, and custom injectionable content. Non-selectable injectionable content and selectable injectionable content can include at least the injectionable content as described above. Additionally, custom injectionable content can be any additional non-selectable injectionable content or selectable injectionable content that the user desires to inject into subsequently viewed web pages.

As shown in FIG. 2, beginning in step S100, control continues to step S105, where a determination is made whether non-selectable injectable content has been selected. If, in step S105, non-selectable injectable content was selected, control jumps to step S120. Otherwise, control advances to step S110.

In step S110, a determination is made whether selectable injectable content has been selected. If, in step S110, selectable injectable content was selected, control continues to step S120. Otherwise, control jumps to step S115.

In step S115, a determination is made whether custom injectable content has been selected. If, in step S110, custom injectable content was selected, control jumps to step S120. Otherwise, control advances to step S125.

In step S120, all of the selected injectable content is stored. Thus, all subsequently viewed web pages include all of the selected injectable content. Control then advances to step S125.

In step S125, a determination is made whether a location has been selected for the injectable content. The location can be, for example, at the top or bottom of the web page, the right or left margin of the web page, or adjacent to each link on the web page that contains such links. If, in step S125 a location for the injectable content has not been selected, control advances to step S130. Otherwise, control jumps to step S135.

In step S130, a default location for the injectable content is stored. Control then jumps to step S140.

In contrast, in step S135, the selected location for the injectable content is stored. Then, in step S140, the method ends.

In various exemplary embodiments, the specific injectable content can be stored in a memory, such as, for example, the memory 230 of the proxy server 200 described above with reference to FIG. 1.

Figure 3:
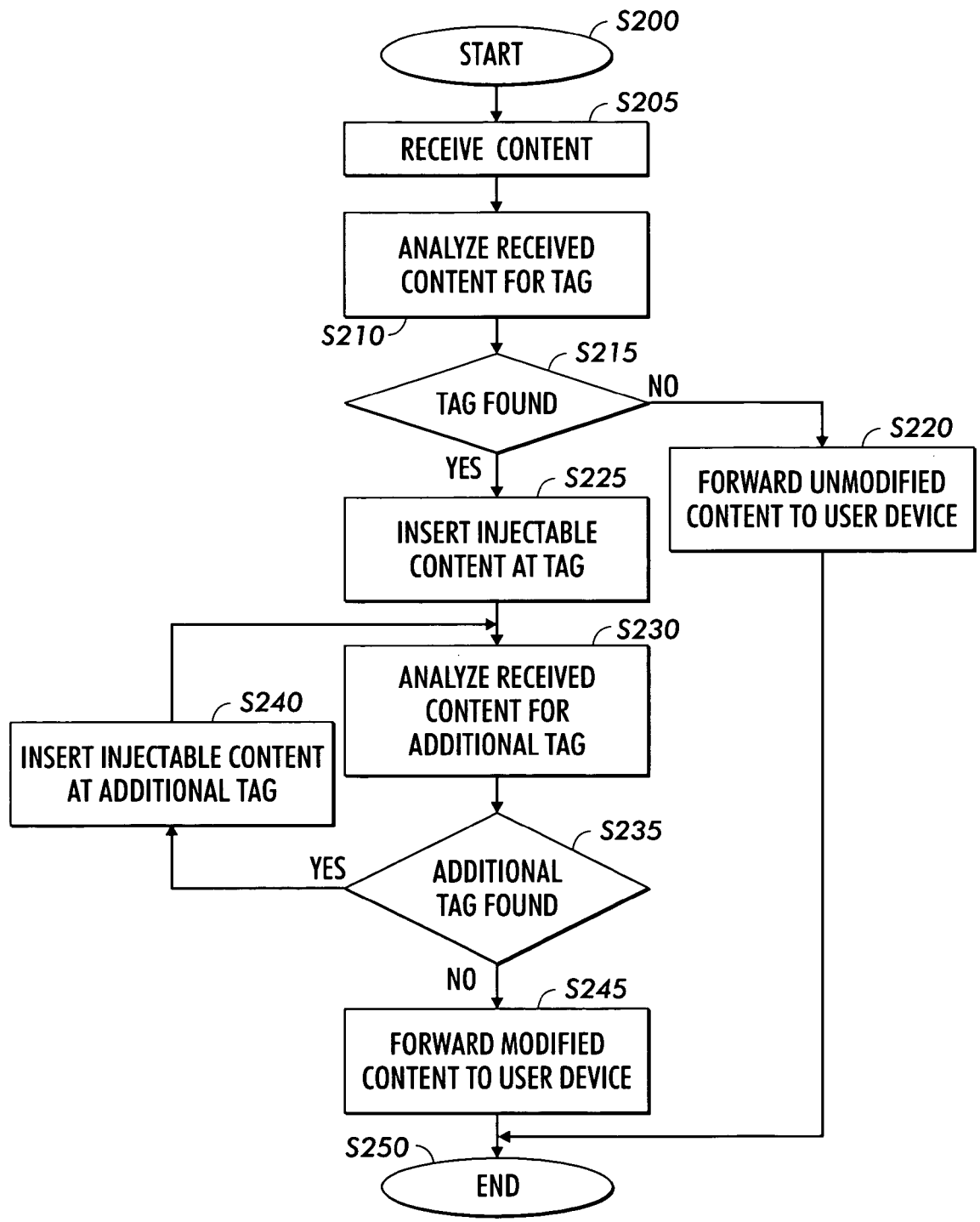
FIG. 3 is a flowchart outlining one exemplary embodiment of a method for injecting specific content into a web document according to this invention.

FIG. 3 is a flowchart outlining one exemplary embodiment of a method for injecting specific content into a web document according to this invention. It should be understood that prior to initiating the method outlined in FIG. 3, specific injectionable content is associated with a proxy server as outlined above with reference to FIG. 2. In FIG. 3, the method begins when a user accesses a web page. As shown in FIG. 3, beginning in step S200, control continues to step S205, where content in the form of, for example, a web page, is received. Then, in step S210, the received web page is analyzed for a tag representing a location on the web page where the injectable content is to be inserted. In step S215, a determination is made whether a tag has been found on the received web page. If, in step S215, no tag is found on the web page, control advances to step S220. Otherwise, control jumps to step S225.

In step S220 the unmodified web page is forwarded to the user. Control then jumps to step S250.

In contrast, in step S225, the injectable content is inserted at the tag. Then, in step S230, the received web page is analyzed for another tag representing another location on the web page where the injectable content is to be inserted. Next, in step S235, a determination is made whether another tag has been found on the received web page. If, in step S235, another tag is found on the web page, control advances to step S240. Otherwise, control jumps to step S245.

In step S240, the injectable content is inserted at the additional tag. Control then returns to step S230.

In contrast, in step S245, the modified web page is forwarded to the user. Then, in step S250, the method ends.

Figure 4:
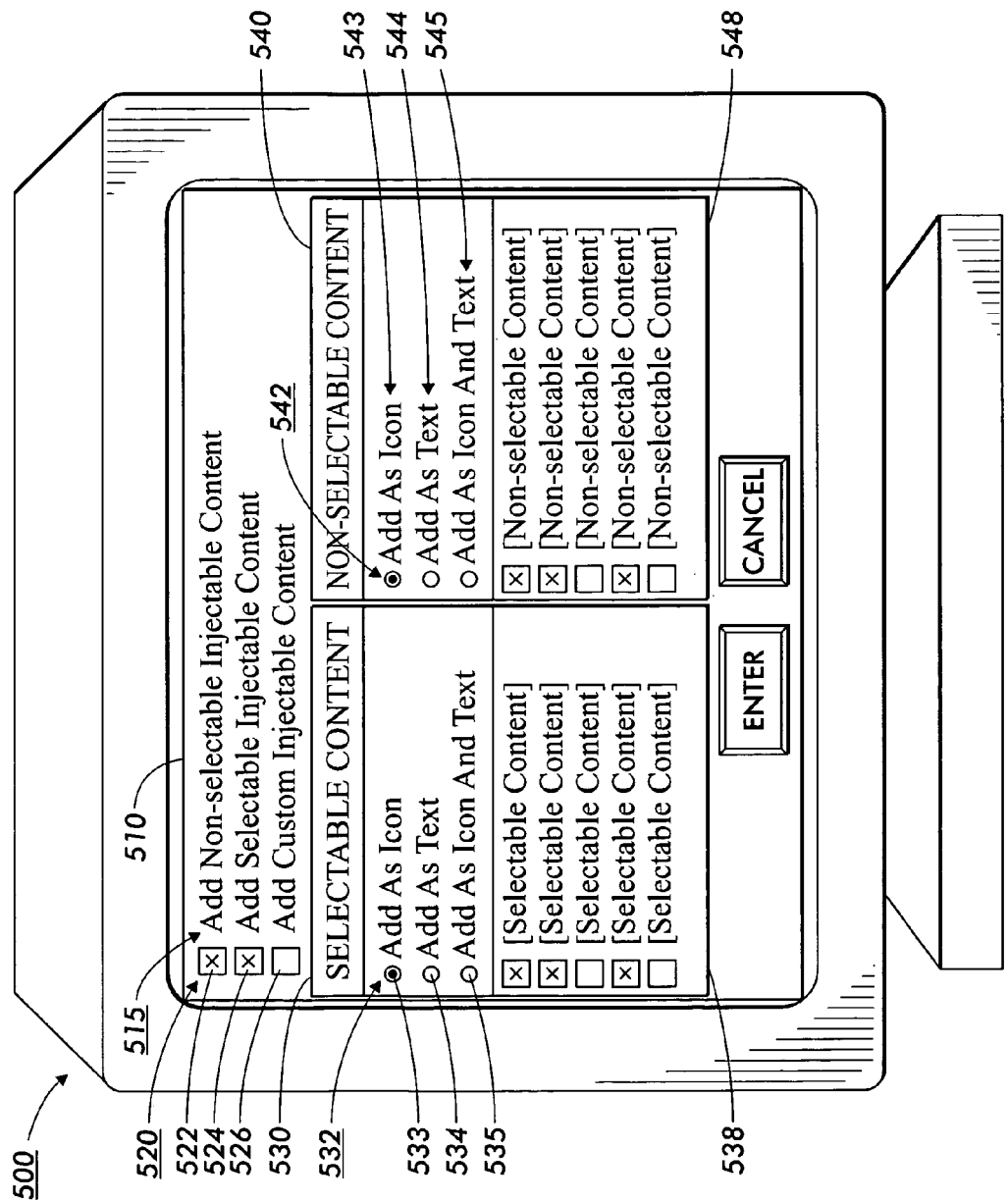
FIG. 4 shows a first exemplary embodiment of a graphical user interface useable to display options for selecting injectable content to be included on a web page according to this invention.

FIG. 4 shows a first exemplary embodiment of a graphical user interface useable to display options for selecting injectable content to be included on a web page according to this invention. As shown in FIG. 4, the graphical user interface 500 includes a selection portion 510. The selection portion 510 includes at least one of a non-selectable injectable content selection portion 520, a selectable content portion 530, and a non-selectable injectable content portion 540.

As shown in FIG. 4, the injectable content selection portion 515 includes a plurality of enable widgets 520. In particular, the plurality of enable widgets 520 include a enable widget 522 that allows the user to enable an "add non-selectable injectable content" function, a enable widget 524 that allows the user to enable an "add selectable injectable content" function, and a enable widget 526 that allows the user to enable an "add custom injectable content" function.

In various exemplary embodiments, the selection portion 510 also includes the selectable content portion 530. The selectable content portion 530 includes at least some of a plurality of enable widgets 532 and a plurality of enable widgets 538. In particular, the plurality of enable widgets 532 include at least some of a enable widget 533 that allows the user to select an "add as icon" function, a enable widget 534 that allows the user to select an "add as text" function, or a enable widget 535 that allows the user to select an "add as icon and text" function. The selectable content portion 530 of the graphical user interface 500 can be implemented, for example, in step S125 as described above with respect to FIG. 2.

If the user selects the "add as icon" function, the selectable content will be added to subsequent web pages and will be represented by an icon, such as, for example, the standard icon for a print function, a printer, to represent the print services selectable content icon as described above. If the user selects the "add as text" function, the selectable content will be added to subsequent web pages and will be represented by text, such as, for example, the word "print" to represent the print services selectable content function as described above. Additionally, if the user selects the "add as icon and text" function, the selectable content will be added to subsequent web pages and will be represented by both an icon and text, such as, for example, the standard icon for a print function with the word "print" to represent the print services selectable content function as described above.

As shown in FIG. 4, each of the plurality of enable widgets 538 corresponds to a selectable content function that can be selected by the user. For each of the selectable content functions that is selected, a corresponding selectable content function is added to each subsequent wed page as described above with reference to FIG. 3.

In various exemplary embodiments, the selection portion 510 also includes the non-selectable injectable content portion 540. The non-selectable injectable content portion 540 includes at least some of a plurality of enable widgets 542 and a plurality of enable widgets 548. The plurality of enable widgets 542 include at least some of an "add as icon" enable widget 543, an "add as text" enable widget 544, or an "add as icon and text" enable widget 545. The enable widgets 543, 544, and 545 and the plurality of enable widgets 548 operate similarly to the same elements discussed above with respect to the selectable content portion 530.

It should be understood that the enable widgets described herein can be any known or later developed display for allowing a user to select a particular item or list of items on a display, such as, for example, a check box, a mark box, a radio button, or the like.

Figure 5:
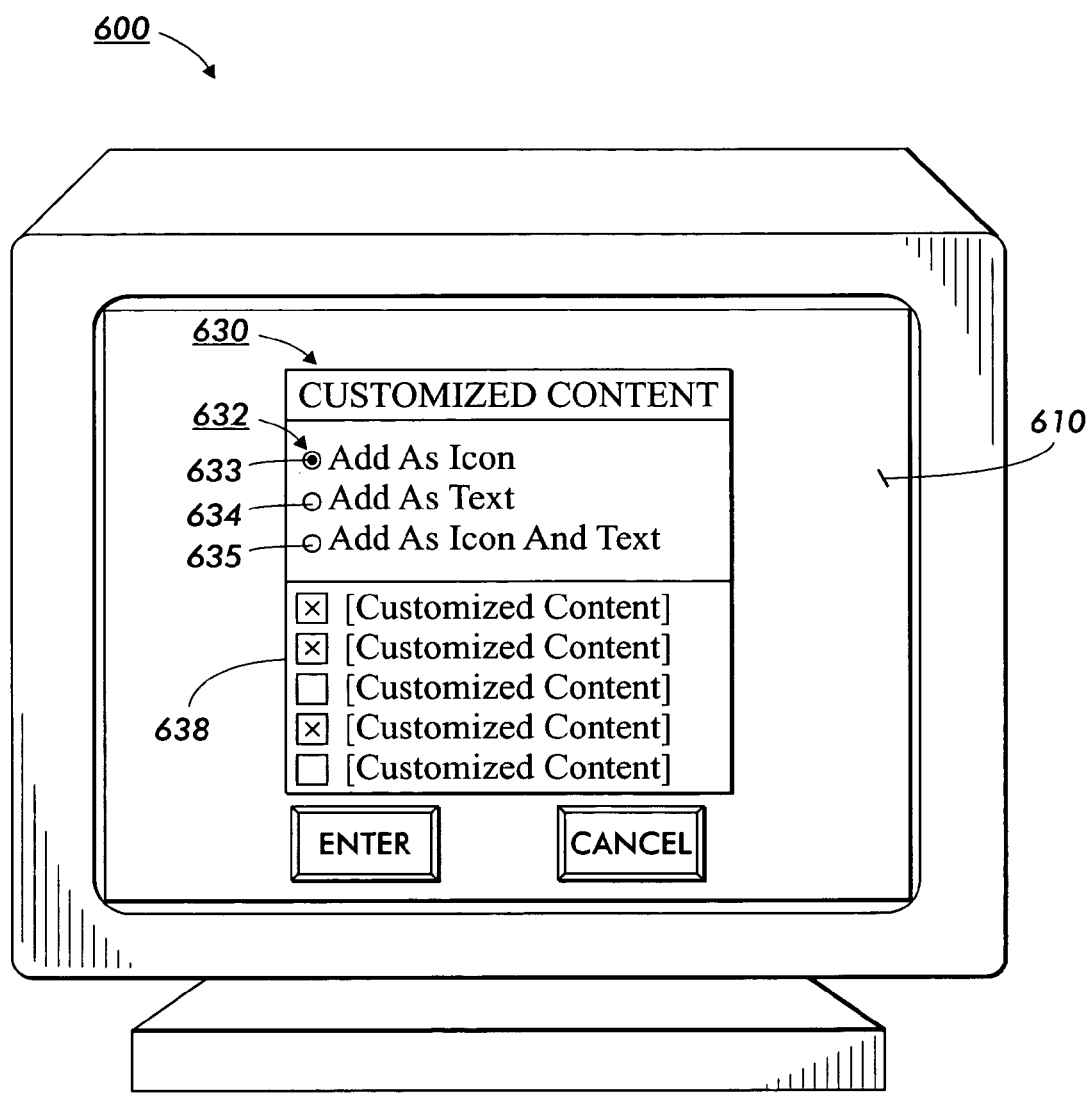
FIG. 5 shows a second exemplary embodiment of a graphical user interface for displaying options useable to select injectable content to be included on a web page according to this invention.

FIG. 5 shows a second exemplary embodiment of a graphical user interface for displaying options useable to select injectable content to be included on a web page according to this invention. As shown in FIG. 5, the graphical user interface 600 includes selection portion 610. The selection portion 610 includes at least one of a custom injectable content portion 630.

As shown in FIG. 5, the custom content portion 630 includes at least some of a plurality of enable widgets 632 and a plurality of enable widgets 638. The plurality of enable widgets 632 include at least some of an "add as icon" enable widget 633, an "add as text" enable widget 634, or an "add as icon and text" enable widget 635. The enable widgets 633, 634, and 635 and the plurality of enable widgets 638 operate similarly to the same elements discussed above with respect the selectable content portion 530 of FIG. 4.

In various exemplary embodiments, the custom content portion 630 is included in the selection portion 510 as shown in FIG. 4. Alternatively, each of the selectable content portion 630, the non-selectable injectable content portion 540, and the custom content portion 530 can be displayed individually and sequentially in response to the selection of the particular injectable content.

Figure 6:
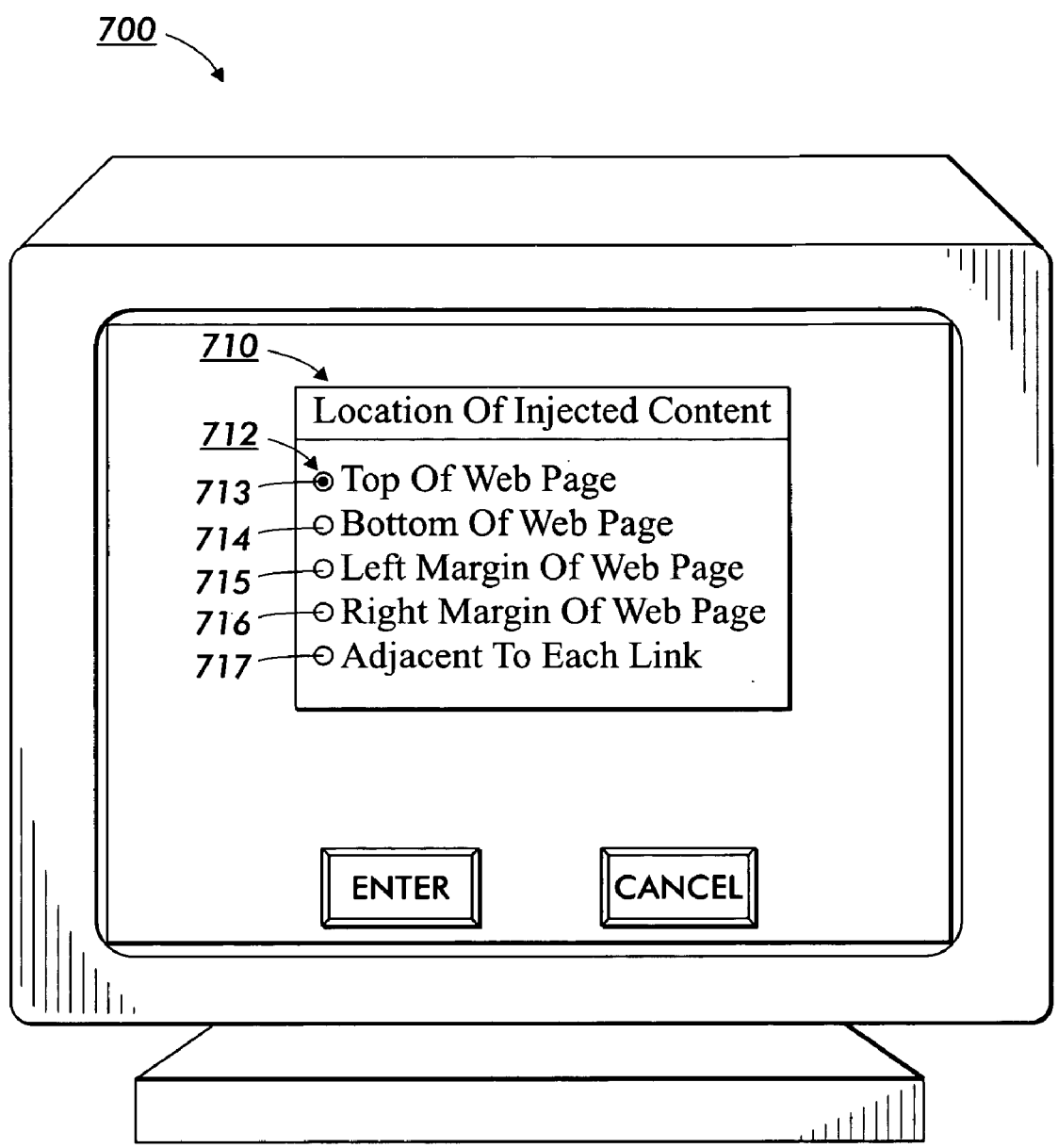
FIG. 6 shows a first exemplary embodiment of a graphical user interface useable to select a location for displaying injected content on a web page according to this invention.

FIG. 6 shows a first exemplary embodiment of a graphical user interface useable to select a location for displaying injected content on a web page according to this invention. As shown in FIG. 6, the graphical user interface 700 includes a location selection portion 710. The location selection portion 710 includes at least some of a plurality of selection widgets 712.

In particular, the plurality of selection widgets 712 include at least some of a selection widget 713 that allows the user to select a display injectable content at the "top of web page" function and a selection widget 714 that allows the user to select a display injectable content at the "bottom of web page" function. The plurality of selection widgets 712 also includes at least some of a selection widget 715 that allows the user to select a display injectable content at the "left margin of web page" function and a selection widget 716 that allows the user to select a display injectable content at the "right margin of web page" function. In various exemplary embodiments, the plurality of selection widgets 712 also includes a selection widget 717 that allows the user to select a display injectable content "adjacent to each link" of web page function.

In response to selecting a location for displaying injected content on a web page, subsequent web pages are displayed with the injectable content located in the selected location or locations.

In various exemplary embodiments, the plurality of selection widgets 712 operate so that more than one location can be selected. For example, this would allow the injectable content to not only be displayed at the top of the web page but also be displayed adjacent to each link on the web page.

Figure 7:
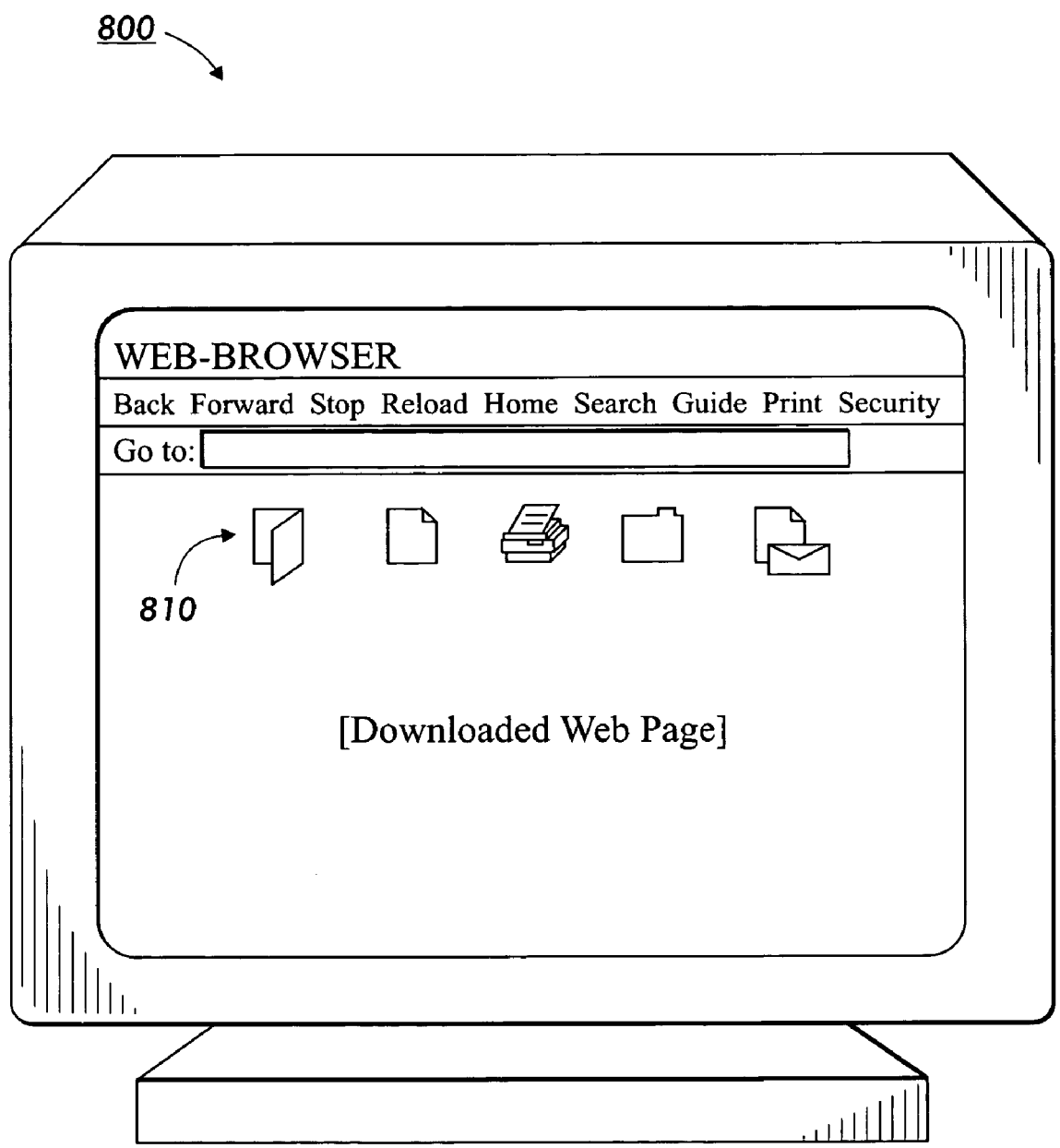
FIG. 7 shows a first exemplary embodiment of a graphical user interface useable to display injected content according to this invention.

FIG. 7 shows a first exemplary embodiment of a graphical user interface useable to display injected content according to this invention. As shown in FIG. 7, the graphical user interface 800 includes an injectionable content bar 810. The injectable content bar 810 includes all of the non-selectable injectable content functions, the selectable injectable content functions, and the custom injectable content functions and the location of the injectable content bar 810 can be selected using the graphical user interfaces shown in FIGS. 4–6.

The graphical user interface 800 illustrates the injectionable content bar 810 being displayed at the top of the web page, for example, as a result of selecting the "add as icon" function, and the "top of web page" location.

Figure 8:
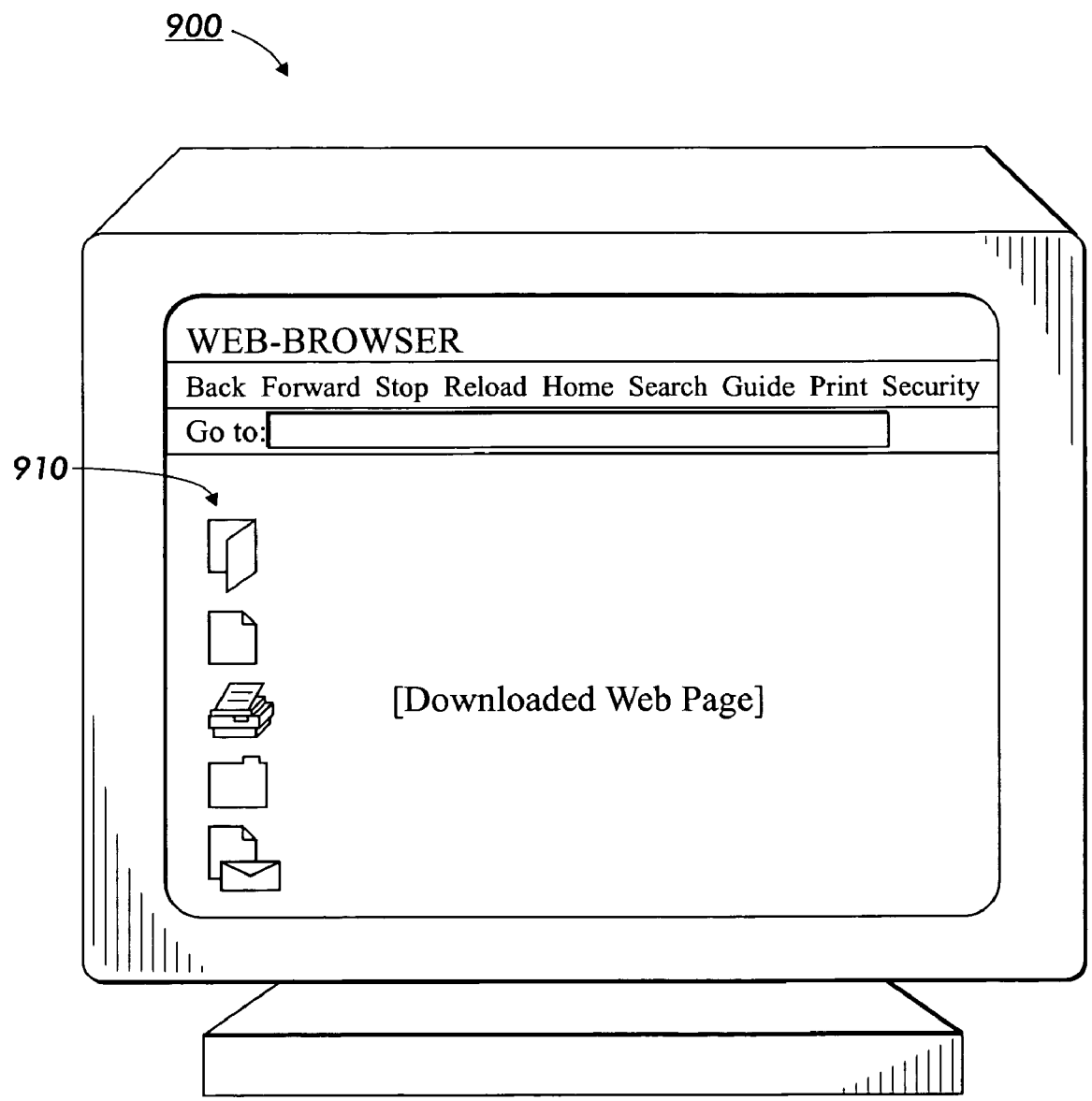
FIG. 8 shows a second exemplary embodiment of a graphical user interface useable to display injected content according to this invention.

FIG. 8 shows a second exemplary embodiment of a graphical user interface useable to display injected content according to this invention. As shown in FIG. 8, the graphical user interface 900 includes an injectionable content bar 910. The injectable content bar 910 includes all of the non-selectable injectable content functions, the selectable injectable content functions, and the custom injectable content functions as selected using the graphical user interface shown in FIGS. 4 and 5 and the methods outlined in FIGS. 2 and 3.

The graphical user interface 900 illustrates the injectionable content bar 910 being displayed in the left margin of the web page, for example, as a result of selecting the "add as icon" function as described above with reference to FIGS. 4 and 5, and the "left margin of web page" selection widget 715 as described above with reference to FIG. 6.

Figure 9:
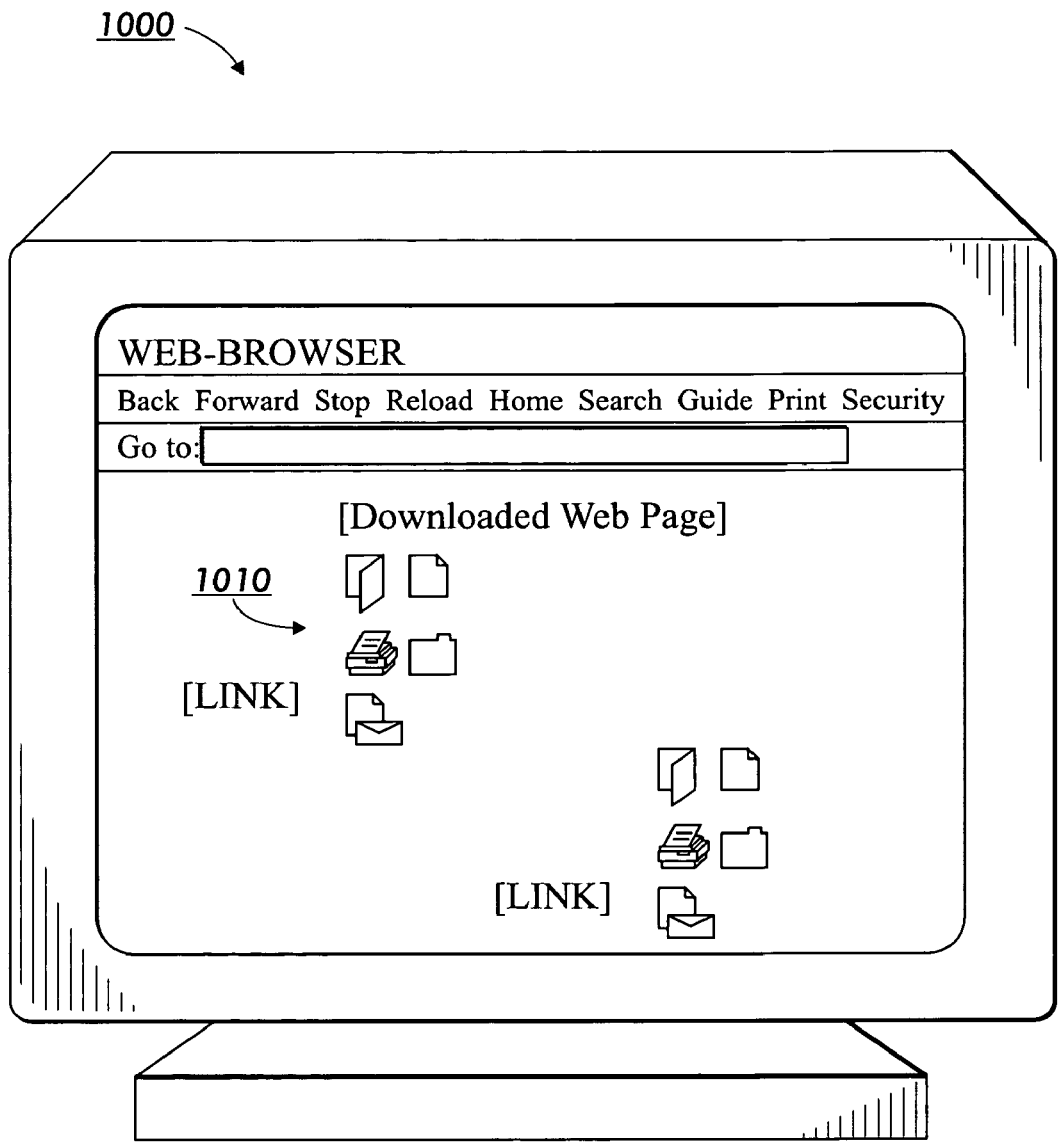
FIG. 9 shows a third exemplary embodiment of a graphical user interface useable to display injected content according to this invention.

FIG. 9 shows a third exemplary embodiment of a graphical user interface useable to display injected content according to this invention. As shown in FIG. 9, the graphical user interface 1000 includes an injectionable content bar 1010. The injectable content bar 1010 includes all of the non-selectable injectable content functions, the selectable injectable content functions, and the custom injectable content functions as selected using the graphical user interface shown in FIGS. 4 and 5 and the methods outlined in FIGS. 2 and 3.

The graphical user interface 1000 illustrates the injectionable content bar 1010 being displayed adjacent to each link of the web page, for example, as a result of selecting the "add as icon" function, and the "adjacent to each link" location.

Figure 10:
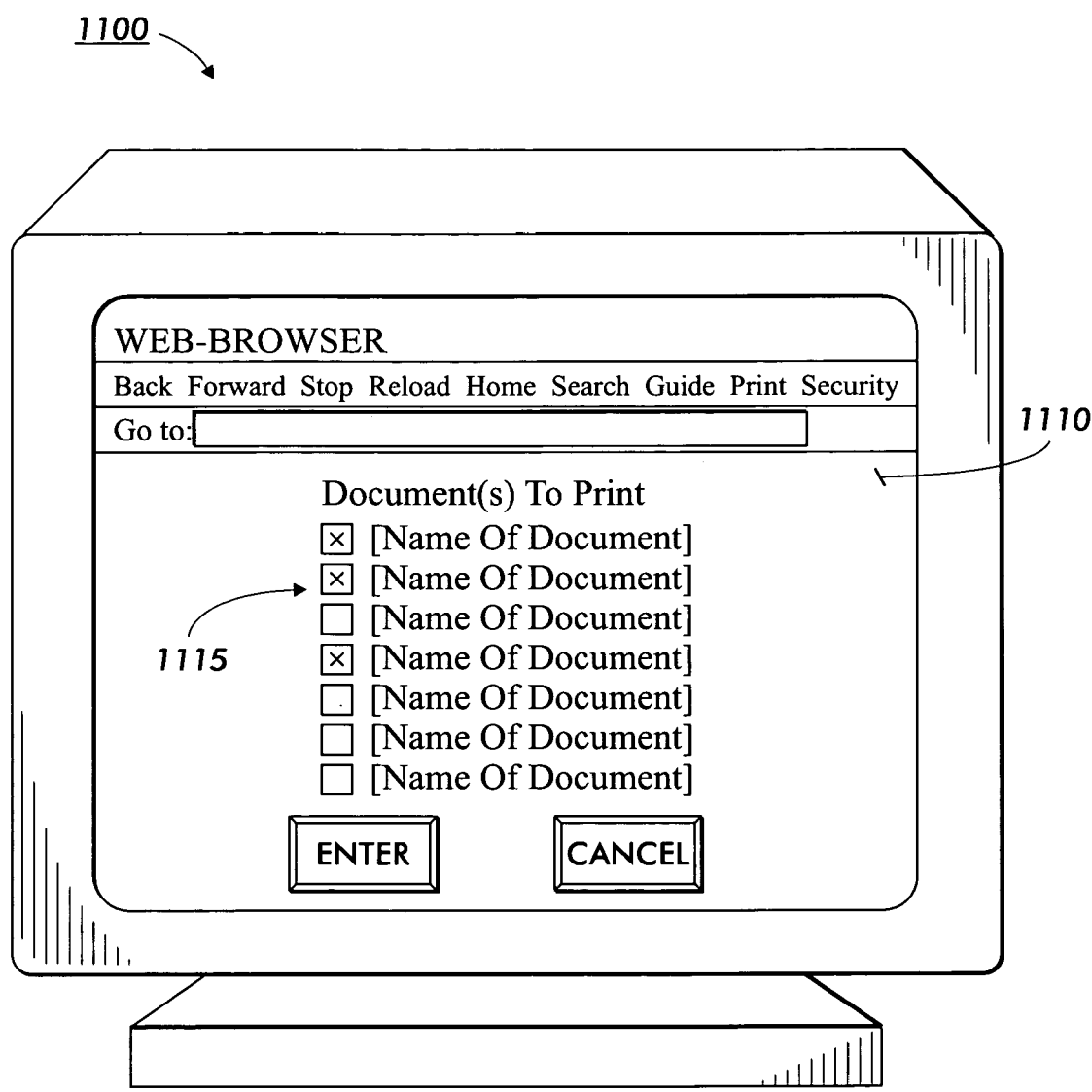
FIG. 10 shows a first exemplary embodiment of a graphical user useable to select documents to be printed using the print services selectable content icon according to this invention.

FIG. 10 shows a first exemplary embodiment of a graphical user useable to select documents to be printed using the print services selectable content icon according to this invention. As shown in FIG. 10, the graphical user interface 1100 includes a display box 1110. In particular, the graphical user interface 1100 can be displayed in response to the user selecting the print services selectable content icon. The display box 1110 includes the name of each printable document accessible through a particular displayed web page. The display box 1110 further includes selection widgets 1115. Each selection widget 1115 corresponds to and represents one printable document accessible through a particular displayed web page. Initially, each selection widget 1115 is not checked.

In one exemplary embodiment, by checking a selection widget 1115, the user selects the corresponding named printable document to be printed. Alternatively, in a second exemplary embodiment, by checking a selection widget 1115, the user selects the correspondingly named printable document not to be printed. Once the user has determined that each printable document's corresponding selection widget 1115 has been appropriately marked, the user may enter the decision. Additionally, the menu 1110 allows the user to cancel the selection process at any time by way of a cancel function.

Figure 11:
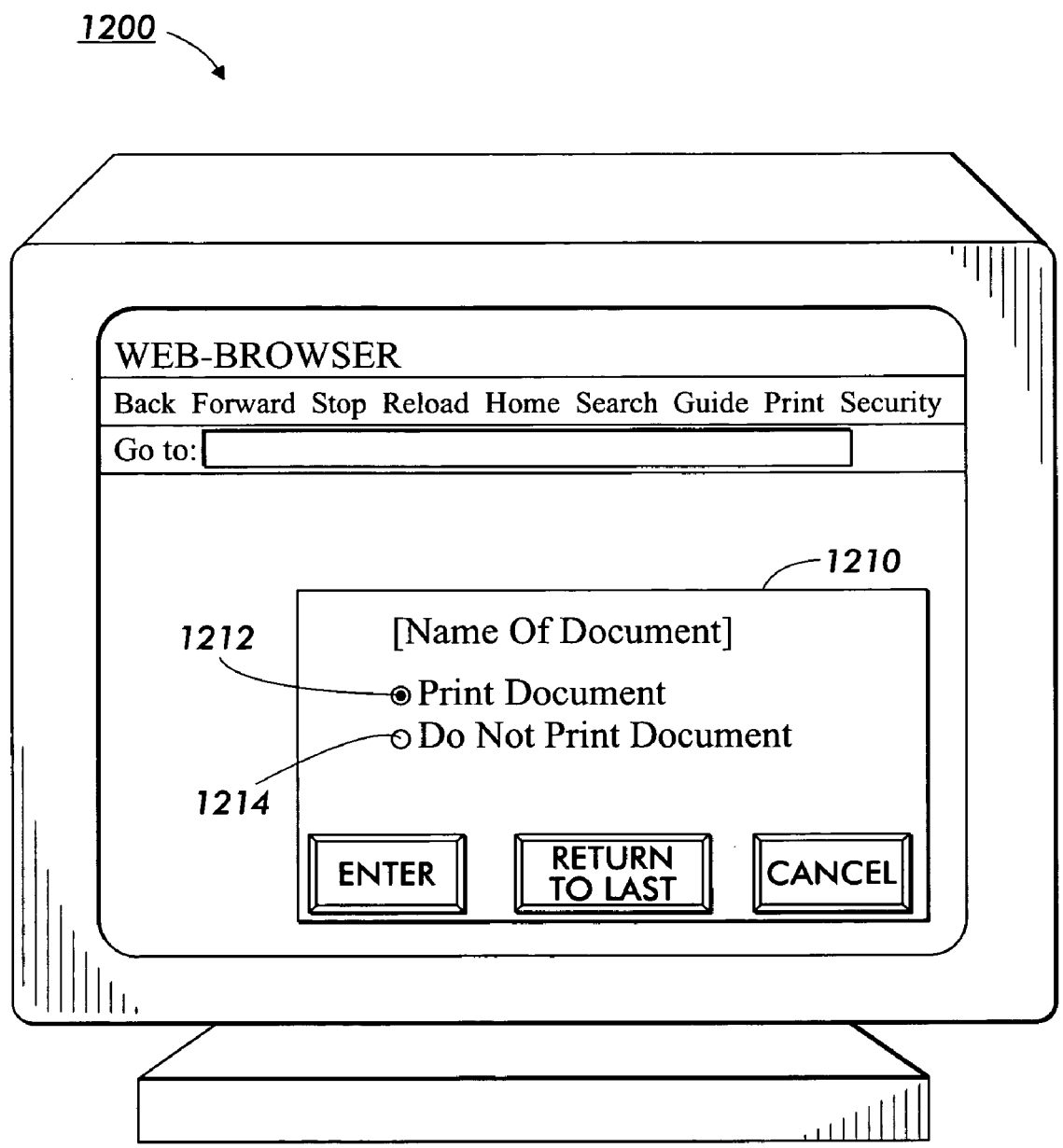
FIG. 11 shows a second exemplary embodiment of a graphical user interface useable to select documents to be printed using the print services selectable content icon according to this invention.

FIG. 11 shows a second exemplary embodiment of a graphical user interface useable to select documents to be printed using the print services selectable content icon according to this invention. As shown in FIG. 11, the graphical user interface 1200 includes a menu 1210. In particular, the graphical user interface 1200 can be displayed in response to the user selecting the print services selectable content icon. The menu 1210 includes a set of selection widgets 1212 and 1214. The selection widget 1212 allows the user to select a "print document function" while the selection widget 1214 allows the user to select a "do not print document function".

The menu 1210 initially appears with the name of the first printable document accessible through a particular displayed web page designated. The user may choose to whether to print the first printable document.

Once the user has input a decision for the first printable document, the menu 1210 reappears with the name of a second printable document, if a second printable document is accessible through the particular displayed web page. Again, as described above, the user may choose whether to print the second printable document. The menu 1210 will reappear sequentially, as described above, until the user has input a decision for each of the printable documents accessible through the particular displayed web page. Each time the menu 1210 is displayed, the menu 1210 allows the user to enter his or her decision, return to the last selection, or cancel the selection process.

It should be understood that the selection widgets described herein can be any known or later developed display for allowing a user to select a particular item or list of items on a display, such as, for example, a check box, a mark box, a radio button, or the like.

Figure 12:
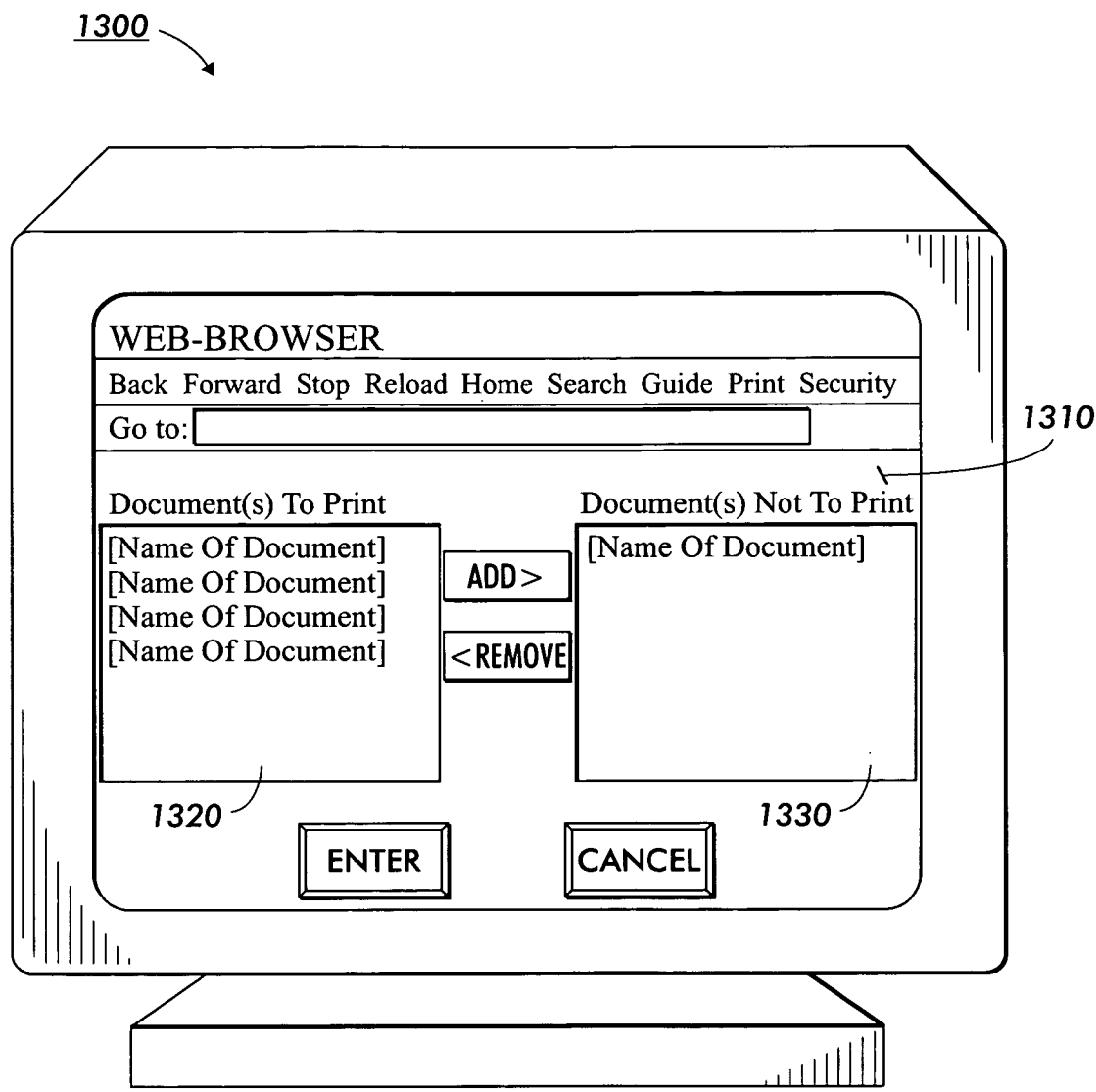
FIG. 12 shows a third exemplary embodiment of a graphical user interface useable to select documents to be printed using the print services selectable content icon according to this invention.

FIG. 12 shows a third exemplary embodiment of a graphical user interface useable to select documents to be printed using the print services selectable content icon according to this invention. As shown in FIG. 12, the graphical user interface 1300 includes a window 1310. The window 1310 includes a display box 1320 and a display box 1330. In particular, the graphical user interface 1300 can be displayed in response to the user selecting the print services selectable content icon. The display box 1320 includes the name of each document to be printed. In contrast, the display box 1330 includes the name of those documents that are not to be printed.

Initially, the display box 1320 includes the name of every printable document that is accessible through a particular displayed web page and the display box 1330 is empty.

The user selects any of the named printable documents accessible through the particular displayed web page listed in the display box 1320 and, by choosing the add function, transfers the selected printable document from the display box 1320 to the display box 1330. Once the user has determined the appropriate one of the display boxes 1320 and 1330 for each printable document, the user may enter the decision. Additionally, the window 1310 allows the user to cancel the selection process at any time by way of a cancel function.

It should be appreciated that, for simplicity and clarification, the embodiments of this invention have been described with reference to printing downloadable information. However, it should be appreciated that the systems and methods of this invention can be implemented not only to print downloadable information but also to perform other functions on downloadable information, such as, for example, saving downloadable information to a specific memory location or forwarding downloadable information to a particular recipient or E-mail account.

It should also be appreciated that the term "web page" is for basic explanation and understanding of the operation of the specific content injection system. Therefore, the term "web page" is not to be construed as limiting a user's ability to access and/or display other forms of information available on a network and to inject specific content into these other forms of displayable information.

It should be understood that each of the elements of the specific content injection system 10 shown in FIG. 1 can be implemented as portions of a suitably programmed general purpose computer. Alternatively, each of the elements of the specific content injection system 10 shown in FIG. 1 can be implemented as physically distinct hardware circuits within an ASIC, or using a FPGA, a PDL, a PLA or a PAL, or using discrete logic elements or discrete circuit elements. The particular form that each of the elements of the specific content injection system 10 shown in FIG. 1 will take is a design choice and will be obvious and predicable to those skilled in the art.

Moreover, the specific content injection system 10 can be implemented as software executing on a programmed general purpose computer, a special purpose computer, a microprocessor or the like. In this case, the specific content injection system 10 can be implemented as a routine embedded in a network client, as a resource residing on a network server, or the like. The specific content injection system 10 can also be implemented by physically incorporating it into a software and/or hardware system, such as the hardware or firmware systems of another personal digital assistant, bi-directional pager, analog or digital cellular phone or the like.

Thus, in summary, the specific content injection system 10 can be implemented on a programmed general purpose computer, a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 2 and 3 and/or the graphical user interfaces shown in FIGS. 4–12, can be used to implement the specific content injection system 10.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of injecting control content into a displayed document on a display device, comprising:
   receiving a document;
   determining whether the received document contains a plurality of links to respective retrievable items;
   inserting injectable control content, represented by an icon, button or image, into the received document at a specified location adjacent to and in respect to the plurality of links to the respective retrievable items; and
   outputting the received document including the injectable control content to the display device,
   wherein selection of the injectable control content adjacent to each link executes a functional operation upon the respective retrievable item identified by the respective link,
   wherein the functional operation comprises at least one of a document printing function, a document storage function, a document editing function, an email function and a facsimile function, and
   wherein the functional operation is performed by and on a server that is separate from, and in communication with the display device over a network.

2. The method of claim 1, wherein each of the retrievable items identified in the received document is at least one of a file, a folder, a picture, a movie, a sound, or a document.

3. The method of claim 1, wherein the injectable control content provides processing of each of the retrievable items without installing software on the display device.

4. The method of claim 1, wherein the specified location to insert the injectable content is determined by a user.

5. The method of claim 1, wherein receiving the document includes receiving the document using at least one of either a wired connection or a wireless connection to a network.

6. The method of claim 1, wherein outputting the received document includes forwarding using at least one of either a wired connection or a wireless connection to the display device.

7. The method of claim 1, wherein:
   the document is received at the display device; and
   the injectable control content is inserted by the display device.

8. An apparatus for injecting control content into a displayed document on a display device, comprising:
   an input circuit that receives an incoming document;
   a content database that stores injectable control content;
   a memory that stores a location for inserting the stored injectable control content into the received document;
   a content monitoring circuit that monitors the incoming document for a plurality of links to respective retrievable items;
   a content injection circuit that injects the injectable control content, represented by an icon, button or image, into the incoming document at a specified location adjacent to and in respect to the plurality of links to the respective retrievable items; and
   an output circuit that outputs the received document including the injectable control content to the display device,
   wherein selection of the injectable control content adjacent to each link executes a functional operation upon the respective retrievable item identified by the respective link,
   wherein the functional operation comprises at least one of a document printing function, a document storage function, a document editing function, an email function and a facsimile function, and
   wherein the functional operation is performed by and on a server that is separate from, and in communication with the display device over a network.

9. The method of claim 8, wherein the injectable control content provides processing of each of the retrievable items without installing software on the display device.

10. A control system that injects control content into a document on a display device, the control system comprising:
    an input circuit that receives an incoming document;
    a content database that stores injectable control content;
    a memory that stores a location for inserting the stored injectable control content into the received document;
    a content monitoring circuit that monitors the incoming document for a plurality of links to respective retrievable items;
    a content injection circuit that injects the injectable control content, represented by an icon, button or image, into the incoming document at a specified location adjacent to and in respect to the plurality of links to the respective retrievable items; and
    an output circuit that transmits the received document including the injectable control content to a display manager of the display device,
    wherein the display manager displays a graphical user interface on the display device, the graphical user interface comprising injectable control content, wherein selection of the injectable control content adjacent to each link executes a functional operation upon the respective retrievable item identified by the respective link, wherein the functional operation comprises at least one of a document printing function, a document storage function, a document editing function, an email function and a facsimile function, and wherein the functional operation is performed by and on a server that is separate from, and in communication with the display device over a network.

11. The control system of claim 10, wherein at least one injectable control content includes at least one selectable icon to access at least one treatment option screen.

12. The control system of claim 11, wherein the treatment option screen has at least one option to process a retrievable item identified in the received document.

13. The control system of claim 12, wherein the treatment option screen is separately displayed for each retrievable item identified in the received document.

14. The control system of claim 13, wherein each treatment option screen is sequentially displayed for each retrievable item identified in the received document.

15. The control system of claim 14, wherein the treatment option screen includes a selectable icon to return to a previous treatment option screen.

16. The control system of claim 11, wherein the treatment option screen has at least one first portion identifying each retrievable item identified in the received document to be processed, at least one second portion for identifying each retrievable item identified in the received document not to be processed, and at least one control for moving a retrievable item identifier between the first and second portions.

17. The control system of claim 11, wherein the treatment option screen lists each retrievable item identified in the received document.

18. The control system of claim 17, wherein the list includes at least one markable box, each markable box associated with one retrievable item identified in the received document.

19. The control system of claim 18, wherein a marked markable box indicates that the associated retrievable item identified in the received document is to be processed, and an unmarked markable box indicates that the associated retrievable item identified in the received document is not to be processed.

20. The control system of claim 18, wherein a marked markable box indicates that the associated retrievable item identified in the received document is not to be processed, and an unmarked markable box indicates that the associated retrievable item identified in the received document is to be processed.

21. The control system of claim 11, wherein the treatment option screen includes a selectable icon to accept the treatment identified on the treatment option screen.

22. The control system of claim 11, wherein the treatment option screen includes a selectable icon to exit the treatment option screen.

23. The control system of claim 11, wherein the treatment option screen includes at least one portion having at least one option to display the injectable control content adjacent to a retrievable item identified in the received document.

* * * * *